United States Patent Office 3,373,157
Patented Mar. 12, 1968

3,373,157
6,6-ETHYLENE-19 NORTESTOSTERONES
Vlasios Georgian, Belmont, Mass., and Kenneth G. Holden, Stratford, N.J., assignors to Smith Kline & French Laboratories, Philadelphia, Pa., a corporation of Pennsylvania
No Drawing. Filed Sept. 17, 1965, Ser. No. 488,274
4 Claims. (Cl. 260—239.55)

ABSTRACT OF THE DISCLOSURE 6,6-ethylene-19-nortestosterones having anabolic-androgenic activity are prepared by ring closure of appropriate 6-hydroxyethyl testosterones.

This invention relates to novel 19-nortestosterone derivatives and more specifically to 6,6-ethylene-19-nortestosterones. These compounds have anabolic-androgenic activity as measured by oral administration to castrated male rats and then determining resultant increases in the weights of the seminal vesicles, ventral prostate and levator ani muscle.

The compounds of this invention may be represented by the following general structural formula:

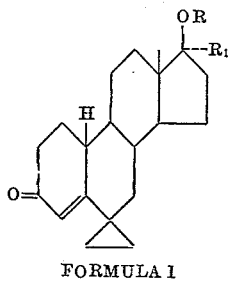

FORMULA I in which:

R represents hydrogen, cyclopenten-1-yl, cyclohexen-1-yl, (1' - ethoxy) - cyclopentyl, (1'-ethoxy)-cyclohexyl, 2'-tetrahydropyranyl or an acyl group of from 2 to 10 carbon atoms; and $R_1$ represents hydrogen, methyl, ethyl, vinyl, ethynyl, chloroethynyl, bromoethynyl, 2-propynyl or 1,1,1-trifluoro-2-propynyl.

Exemplary of preferred acyl groups are those derived from a lower aliphatic carboxylic acid such as acetyl or propionyl, or from a substituted lower aliphatic carboxylic acid such as cyclopentylpropionyl, phenylpropionyl or p-chlorophenoxyacetyl.

The novel 19-nortestosterone derivatives of this invention generally are prepared as illustrated by the following sequence:

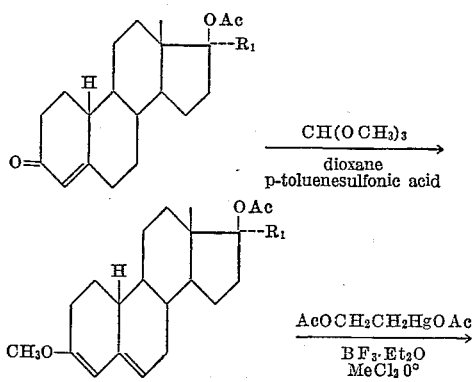

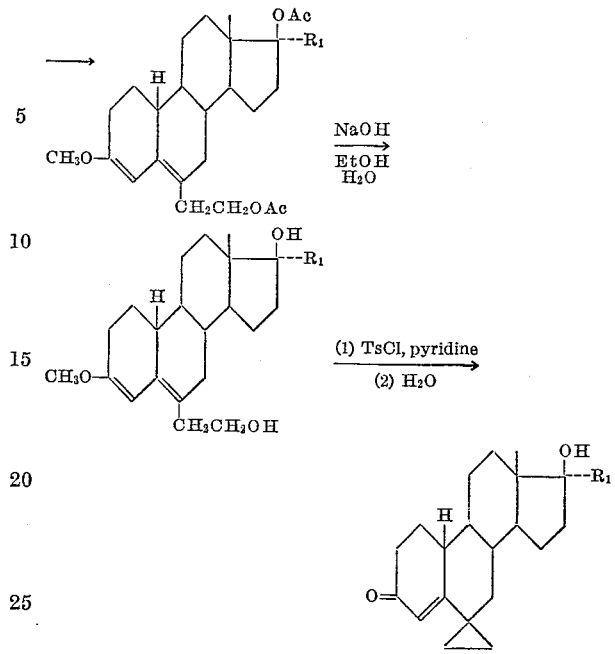

Thus as shown above a 17β-acetoxy - 3 - methoxy-19-norandrosta - 3,5 - diene is condensed with preferably β-acetoxyethyl mercuric acetate in a nonreactive organic solvent such as methylene chloride, chloroform or ethylene chloride. A Lewis acid catalyst is employed, preferably boron trifluoride most conveniently as its etherate. The reaction is carried out over a temperature range of from 0° C. to room temperature, preferably 0–5° C., for up to about three hours. Reaction of long duration results in aromatization and decomposition.

The resulting 6-(β-acetoxyethyl) compound is hydrolyzed to the corresponding 6-(β-hydroxyethyl) derivative by treatment with sodium or potassium hydroxide which is then converted into a reactive ester derivative such as the preferred p-toluenesulfonate by standard reactions. This ester cyclizes under mild conditions such as in the presence of water in pyridine solution to the desired 6,6-ethylene-19-nortestosterone product.

The 17α-vinyl derivatives of Formula I are advantageously prepared from the corresponding 6,6-ethylene-17α-ethynyl-19-nortestosterones by hydrogenation with preferably Lindlar's catalyst comprised of palladium and barium sulfate plus lead. Reduction of the 17α-ethynyl group with palladium-charcoal in dioxane until 2 moles of hydrogen are absorbed gives the corresponding 6,6-ethylene-17α-ethyl-19-nortestosterones.

The cycloalkyl and cycloalkenyl ethers of Formula I are advantageously prepared from the 6,6-ethylene-19-nortestosterones by reaction with the diethylketal of cyclopentanone or cyclohexanone. Brief heating in a low boiling solvent such as chloroform containing an acid catalyst under carefully controlled conditions yields the (1'-ethoxy)-cycloalkyl ethers whereas heating in a higher boiling solvent such as benzene or in the diethylketal without a solvent or catalyst gives the cycloalkenyl ethers.

The tetrahydropyranyl ethers of Formula I are advantageously prepared from the 6,6-ethylene - 19 - nortestosterones by reaction with dihydropyran in the presence of an acid catalyst preferably in an inert organic solvent such as benzene.

Alternatively the compounds of Formula I having an ether functional group in the 17-position are prepared from starting materials already possessing the ether group.

The compounds of Formula I where R is an acyl group are prepared by reacting the 6,6-ethylene - 19 - nortestosterone derivative with the desired acyl halide or anhydride in a tertiary amine such as pyridine.

The novel compounds of this invention may be administered orally or parenterally in conventional dosage forms such as tablets, capsules, injectables or the like, by incorporating the appropriate dose of a compound of Formula I with carriers according to accepted pharmaceutical practices.

The following examples are set forth to illustrate the preparative procedures outlined above and are not intended to limit the scope of this invention.

*Example 1*

A solution of 49 g. of 19-nortestosterone acetate in 65 ml. of dioxane and 50 ml. of trimethylorthoformate is treated with 0.50 g. of p-toluenesulfonic acid with stirring. After eight hours the reaction mixture is quenched with pyridine, cooled and diluted with 115 ml. of water. The crystalline product is collected by filtration and recrystallized from alcohol-water containing a few drops of pyridine to yield 17β-acetoxy-3-methoxy-19-norandrosta-3,5-diene, M.P. 149–154° C.

To a stirred solution of 3.3 g. of the diene and 5.2 g. of β-acetoxyethyl mercuric acetate [K. Ichikawa, K. Fujita and H. Ouchi, J. Am. Chem. Soc., 81, 5316 (1959)] in 20 ml. of methylene chloride is added 0.3 ml. of borotrifluoride etherate. The addition is carried out dropwise under nitrogen at 0° C. The reaction mixture is maintained at 0° C. with stirring for 3 hours, quenched with 2 ml. of pyridine, diluted with methylene chloride, decanted from precipitated mercury, washed with dilute sodium carbonate solution, dried, and evaporated to a residue. The residue is dissolved in 50 ml. of benzene-petroleum ether (1:2) and filtered through a column of 60 g. of activity III Woelm alumina. The column is washed with 200 ml. of the same solvent mixture and the total filtrate is evaporated to yield 17β-acetoxy - 6 - (β - acetoxyethyl) - 3 - methoxy - 19 - norandrosta-3,5-diene.

A solution of 0.5 g. of the diacetate in 15 ml. of alcohol is refluxed with 1 ml. of 40% aqueous sodium hydroxide for 45 minutes. The cooled reaction mixture is diluted with water and extracted with methylene chloride. The methylene chloride extracts are dried and evaporated to a residue which is crystallized from ether, M.P. 173–178° C. Recrystallization from acetone-hexane gives pure 17β - hydroxy - 6 - (β - hydroxyethyl) - 3-methoxy - 19 - norandrosta-3,5-diene, M.P. 183–185° C.

A solution of 0.10 g. of the diol in 1 ml. of pyridine is treated with 0.09 g. of p-toluenesulfonyl chloride at 0° C. After 1.5 hours at 0° C. the reaction mixture is warmed to 27° C. for 0.5 hour, treated with 3 drops of water and allowed to stand for 16 hours. The reaction mixture is diluted with water and extracted with methylene chloride. After washing the methylene chloride extract with cold, dilute phosphoric acid it is dried and evaporated to a residue. The residue is dissolved in 10 ml. of benzene-petroleum ether (1:1) and chromatographed on 4 g. of activity III Woelm alumina. Elution with benzene and benzene-methylene chloride (3:1) gives 6,6-ethylene-19-nortestosterone which, after crystallization from ether petroleum ether, melts at 121–122° C.

Acetylation with acetic anhydride yields the corresponding 6,6-ethylene-19-nortestosterone acetate.

*Example 2*

By employing the general procedures of Example 1, the following 19-nortestosterones are converted to corresponding 6,6-ethylene-19-nortestosterones:

(A)

*Starting material.*—17α-methyl-19-nortestosterone acetate.
*Product.*—6,6 - ethylene - 17α-methyl-19-nortestosterone.

(B)

*Starting material.*—17α-ethynyl-19-nortestosterone acetate.
*Product.*—6,6 - ethylene-17α-ethynyl-19-nortestosterone.

(C)

*Starting material.*—17α - chloroethynyl - 19-nortestosterone acetate.
*Product.*—6,6-ethylene - 17α - chloroethynyl - nortestosterone.

(D)

*Starting material.*—17α - bromoethynyl - 19 - nortestosterone acetate.
*Product.*—6,6 - ethylene - 17α - bromoethynyl - 19 - nortestosterone.

(E)

*Starting material.*—17α - (2 - propynyl) - 19 - nortestosterone acetate.
*Product.*—6,6 - ethylene - 17α - (2 - propynyl) - 19 - nortestosterone.

(F)

*Starting material.*—17α - (1,1,1 - trifluoro-2-propynyl)-19-nortestosterone acetate.
*Product.*—6,6 - ethylene - 17α - (1,1,1 - trifluoro - 2-propynyl)-19-nortestosterone.

*Example 3*

A suspension of 3.5 g. of 6,6-ethylene-19-nortestosterone in 100 ml. of dry benzene is treated with 50 mg. of p-toluenesulfonic acid hydrate and 3.0 ml. of dihydropyran and the suspension stirred at room temperature for about one hour. The reaction mixture is washed with 5% sodium bicarbonate solution and water. After drying, the solvent is evaporated to give 6,6-ethylene-19-nortestosterone-17-(2'-tetrahydropyranyl)-ether.

*Example 4*

A solution of 5.0 g. of 6,6-ethylene-19-nortestosterone and 10 ml. of cyclopentanone diethylketal in 50 ml. of chloroform containing 25 mg. of p-toluenesulfonic acid is heated for 30 minutes. The reaction mixture is washed with 5% sodium bicarbonate solution and water, dried and evaporated. The residue is taken up in methanol and recrystallized to give the 17-(1'-ethoxy)-cyclopentyl ether of 6,6-ethylene-19-nortestosterone.

Similarly, reaction with cyclohexanone diethylketal yields the 17-(1'-ethoxy)-cyclohexyl ether of 6,6-ethylene-19-nortestosterone.

*Example 5*

A solution of 325 mg. of 6,6-ethylene-17α-ethynyl-19-nortestosterone in 100 ml. of ethanol is shaken with hydrogen and 100 mg. of Lindlar's catalyst (palladium and barium sulfate plus lead). After 15 minutes the required absorption of hydrogen is completed and the reaction mixture is filtered. The filtrate is evaporated to give 6,6 - ethylene - 17α - vinyl - 19 - nortestosterone.

*Example 6*

A mixture of 5.0 g. of 6,6-ethylene-19-nortestosterone and 10 ml. of cyclopentanone diethylketal is heated for 30 minutes at 145° C. then at 180–190° C. to give a residue which is taken up in methanol and recrystallized to give the cyclopenten-1-yl ether of 6,6-ethylene-19-nortestosterone.

Similarly, reaction with cyclohexanone diethylketal yields the cyclohexen-1-yl ether of 6,6-ethylene-19-nortestosterone.

*Example 7*

A mixture of 8.0 g. of 6,6-ethylene-19-nortestosterone and 100 ml. of dry pyridine is cooled and treated with 16.9 g. of p-chlorophenoxyacetyl chloride. After 24 hours at room temperature the mixture is cooled to 0° C., quenched in brine and then taken up in ethyl acetate. Evaporation gives 6,6-ethylene-19-nortestosterone-17-p-chlorophenoxy-acetate.

Similar, following the above general directions, 8.0 g. of 6,6-ethylene-19-nortestosterone is reacted with 7.6 g. of propionyl chloride, 13.3 g. of cyclopentylpropionyl chloride or 13.9 g. of phenylpropionyl chloride to give 6,6-ethylene - 19 - nortestosterone - 17 - propionate, 17 - cyclopentylpropionate or 17-phenylpropionate, respectively.

*Example 8*

A solution of 500 mg. of 6,6-ethylene-17α-ethynyl-19-nortestosterone in 125 ml, of dioxane is shaken with hydrogen and 100 mg. of palladium-charcoal catalyst until 2 moles of hydrogen is absorbed. The reaction mixture is filtered and the filtrate evaporated to give 6,6-ethylene-17α-ethyl-19-nortestosterone.

What is claimed is:

1. A chemical compound of the formula:

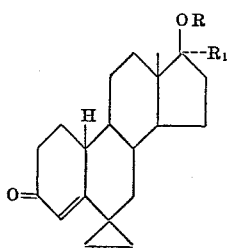

wherein:
R is cyclopenten-1-yl, cyclohexen-1-yl, (1'-ethoxy)-cyclopentyl, (1'-ethoxy)-cyclohexyl, or 2'-tetrahydropyranyl; and
$R_1$ is hydrogen.

2. A chemical compound of the formula:

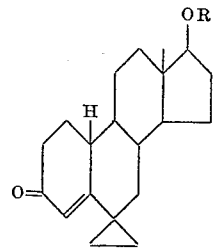

wherein R is cyclopenten-1-yl, or 2'-tetrahydropyranyl.

3. 6,6 - ethylene-19-nortestosterone-17-cyclopenten-1-yl ether.

4. 6,6-ethylene - 19 - nortestosterone-17-(2'-tetrahydropyranyl)-ether.

References Cited

UNITED STATES PATENTS 3,261,829    7/1966    Colten et al. _____ 260—239.55

ELBERT L. ROBERTS, *Primary Examiner.*